US009272714B2

(12) United States Patent
Rao et al.

(10) Patent No.: US 9,272,714 B2
(45) Date of Patent: Mar. 1, 2016

(54) DRIVER BEHAVIOR BASED VEHICLE APPLICATION RECOMMENDATION

(71) Applicant: Ford Global Technologies, LLC, Dearborn, MI (US)

(72) Inventors: Manoharprasad K. Rao, Novi, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/263,477

(22) Filed: Apr. 28, 2014

(65) Prior Publication Data

US 2015/0307106 A1 Oct. 29, 2015

(51) Int. Cl.

| | |
|---|---|
| ***G06F 7/00*** | (2006.01) |
| ***G06Q 40/00*** | (2012.01) |
| ***G06F 15/16*** | (2006.01) |
| ***B60W 40/09*** | (2012.01) |
| ***B60W 50/14*** | (2012.01) |
| ***G06Q 30/06*** | (2012.01) |

(52) U.S. Cl.

CPC ............... *B60W 40/09* (2013.01); *B60W 50/14* (2013.01); *G06Q 30/0631* (2013.01); *B60W 2540/30* (2013.01)

(58) Field of Classification Search

USPC ............................... 701/29.1; 705/4; 709/219

See application file for complete search history.

(56) References Cited

U.S. PATENT DOCUMENTS

| | | | | |
|---|---|---|---|---|
| 2009/0319341 | A1 | 12/2009 | Berkobin et al. | |
| 2011/0037618 | A1 * | 2/2011 | Ginsberg et al. | 340/905 |
| 2011/0040707 | A1 | 2/2011 | Theisen et al. | |
| 2011/0077028 | A1 * | 3/2011 | Wilkes et al. | 455/456.3 |
| 2011/0153175 | A1 * | 6/2011 | Zhang et al. | 701/70 |
| 2012/0109418 | A1 * | 5/2012 | Lorber | 701/1 |
| 2012/0116559 | A1 * | 5/2012 | Davis et al. | 700/94 |
| 2012/0208592 | A1 * | 8/2012 | Davis et al. | 455/556.1 |
| 2012/0284012 | A1 * | 11/2012 | Rodriguez et al. | 704/1 |
| 2012/0317266 | A1 * | 12/2012 | Abbott | 709/224 |
| 2013/0006674 | A1 * | 1/2013 | Bowne et al. | 705/4 |
| 2013/0024060 | A1 | 1/2013 | Sukkari et al. | |
| 2013/0036058 | A1 * | 2/2013 | Kelly et al. | 705/67 |
| 2013/0046510 | A1 * | 2/2013 | Bowne et al. | 702/187 |
| 2013/0083722 | A1 * | 4/2013 | Bhargava et al. | 370/315 |
| 2013/0204455 | A1 * | 8/2013 | Chia et al. | 701/1 |
| 2013/0265178 | A1 * | 10/2013 | Tengler et al. | 340/989 |
| 2013/0316311 | A1 * | 11/2013 | England | 434/65 |
| 2014/0006329 | A1 * | 1/2014 | Hu et al. | 706/46 |
| 2014/0149145 | A1 * | 5/2014 | Peng et al. | 705/4 |
| 2014/0162219 | A1 * | 6/2014 | Stankoulov | 434/65 |
| 2014/0279707 | A1 * | 9/2014 | Joshua et al. | 705/400 |
| 2014/0373184 | A1 * | 12/2014 | Mahaffey et al. | 726/35 |
| 2015/0006677 | A1 * | 1/2015 | Mahajan et al. | 709/219 |
| 2015/0025917 | A1 * | 1/2015 | Stempora | 705/4 |

* cited by examiner

*Primary Examiner* — Thomas G Black
*Assistant Examiner* — Tyler Paige
(74) *Attorney, Agent, or Firm* — Jennifer M. Stec; Brooks Kushman P.C.

(57) ABSTRACT

A vehicle computing system may execute a recommendation application to identify driver characteristics descriptive of the driving style of a driver of the vehicle based at least in part on captured vehicle data, determine an application recommendation for a mobile application to be installed by the driver based on the driver characteristics, and to send the application recommendation to the driver.

20 Claims, 4 Drawing Sheets

DRIVER BEHAVIOR BASED VEHICLE APPLICATION RECOMMENDATION

TECHNICAL FIELD

This disclosure generally relates to providing application recommendations to a driver of a vehicle based on learned information regarding the behavior of the driver.

BACKGROUND

To support various telematics features of the vehicle, a mobile device may be paired with the telematics system and may execute mobile applications to provide the system with access to content or other function of the mobile device. Once paired, the vehicle telematics system may be able to offer voice commands to allow the driver to control applications of the mobile device, such as streaming radio and messaging, without fumbling through mobile device menus.

SUMMARY

In a first illustrative embodiment, a system includes a computing system of a vehicle configured to execute a recommendation application to identify driver characteristics descriptive of a driving style of a driver of the vehicle based at least in part on captured vehicle data, determine an application recommendation for a mobile application to be installed by the driver based on the driver characteristics, and send the application recommendation to the driver.

In a second illustrative embodiment, a computer-implemented method includes identifying driver characteristics descriptive of a driving style of the driver of a vehicle based at least in part on captured vehicle data indicative of driver inputs to the vehicle and behavior of the vehicle responsive to the driver inputs, determining an application recommendation for a mobile application to be installed by the driver based on the driver characteristics, and sending the application recommendation to the driver.

In a third illustrative embodiment, a non-transitory computer-readable medium including instructions of a recommendation application that, when executed by a vehicle computing system, is configured to cause the vehicle computing system to identify driver characteristics descriptive of a driving style of a driver of the vehicle based at least in part on captured vehicle data indicative of driver inputs to the vehicle and behavior of the vehicle responsive to the driver inputs, determine an application recommendation for a mobile application to be installed by the driver based on the driver characteristics, and to send the application recommendation to the driver.

DETAILED DESCRIPTION

Figure 1:
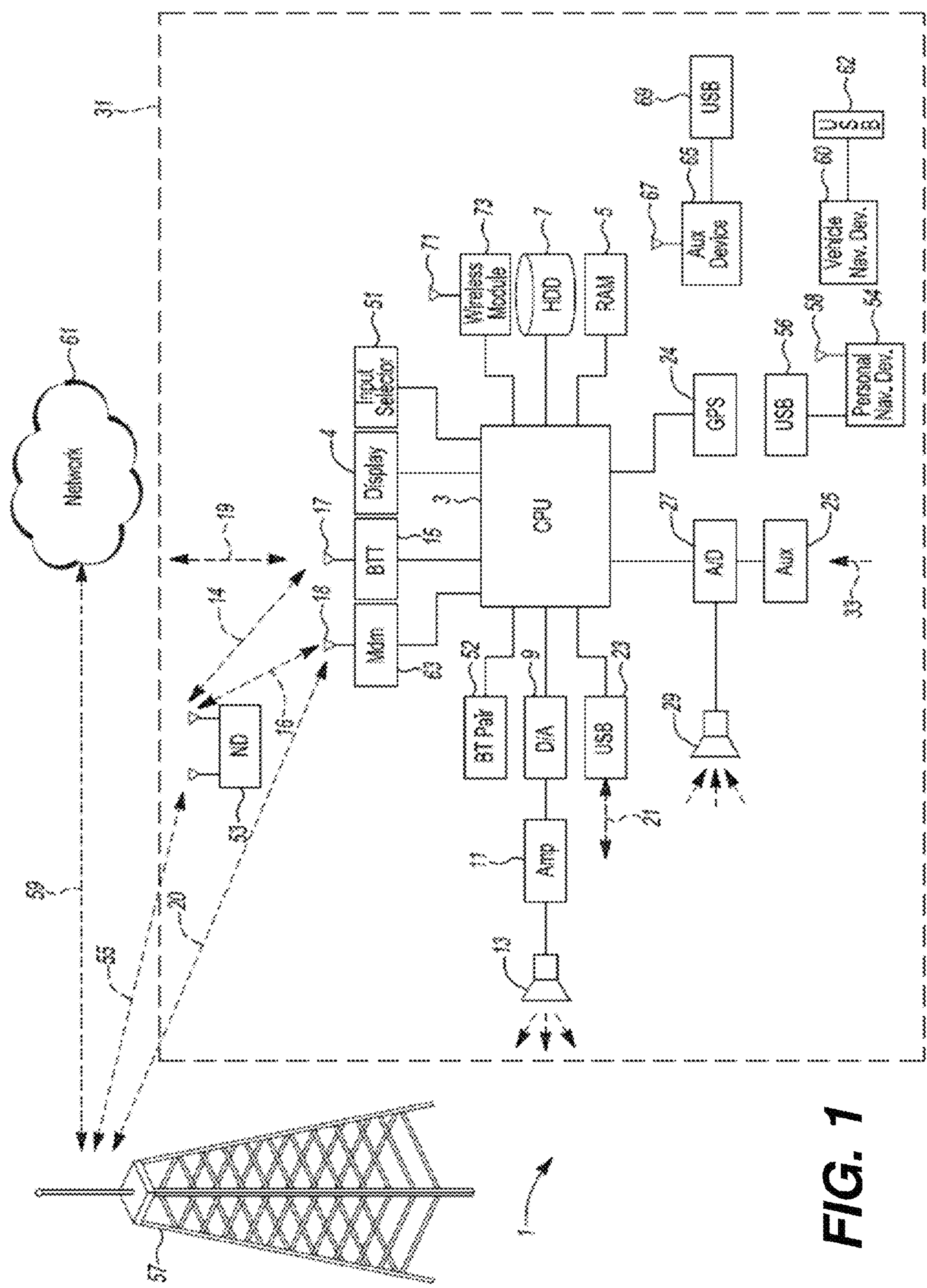
FIG. 1 is an exemplary block topology of a vehicle infotainment system implementing a user-interactive vehicle based computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mobile application may refer to a software executable that is stored on and executed by a mobile device, such as a cell phone. A vehicle-based computing system (VCS) may include gateway functionality to allow such mobile applications to present a human-machine interface (HMI) through a user interface of the vehicle. Thus, while the mobile application may be executed by the mobile device, the application may utilize the user interface of the vehicle to provide information to the driver or other occupants of the vehicle.

Mobile applications may be developed that utilize the VCS and data from various sources to provide additional functionality to improve the experience of the driver. These data sources may include, for example, vehicle data (e.g., received via the vehicle bus), information retrieved via the Internet, and information retrieved via vehicle-to-vehicle or vehicle-to-infrastructure communication. While numerous mobile applications may be developed to improve the driving experience or provide infotainment and connectivity, it may be difficult for the driver to know what mobile applications are available that may be useful for him or her.

The VCS may be configured to utilize a recommendation application to determine driver characteristics regarding the driver's driving style, behavior and preferences. The recommendation application may be configured to learn the driver characteristics according to the data source inputs. Based on the learned driver characteristics, the recommendation application may recommend mobile applications for the driver to download that would be beneficial for the particular driver in enhancing his or her driving experience. As some examples, the recommended applications may include: a driver intelligent do-not-disturb application configured to selectively disable features of other telematics applications, a fuel economy application configured to aid a driver in improving the efficiency of his or her driving style, a traffic application configured to provide road condition information, a pollen alert application configured to provide allergy information, a fatigue application configured to monitor and alert the driver to his or her level of fatigue, an application configured to provide alerts according to the driver-specific driving of the vehicle, and a vehicle dynamics application configured to provide current and historical vehicle information.

The VCS may be configured to present these recommendations to the driver in various ways, such as via a vehicle display, a vehicle voice message, in a message directed to an e-mail account associated with the vehicle or driver, in a message directed to a Twitter account associated with the vehicle or driver, or via a selected connectivity system such as the user's mobile device. The driver may receive the application recommendations, and may download and install the recommended mobile applications to help improve the driving experience.

While many examples herein relate to mobile applications executed by the user's mobile device, it should be noted that the recommendation functionality discussed herein is applicable to other scenarios as well. For example, the recommendation application may additionally or alternately be configured to provide recommendations for applications to be installed on the VCS itself.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
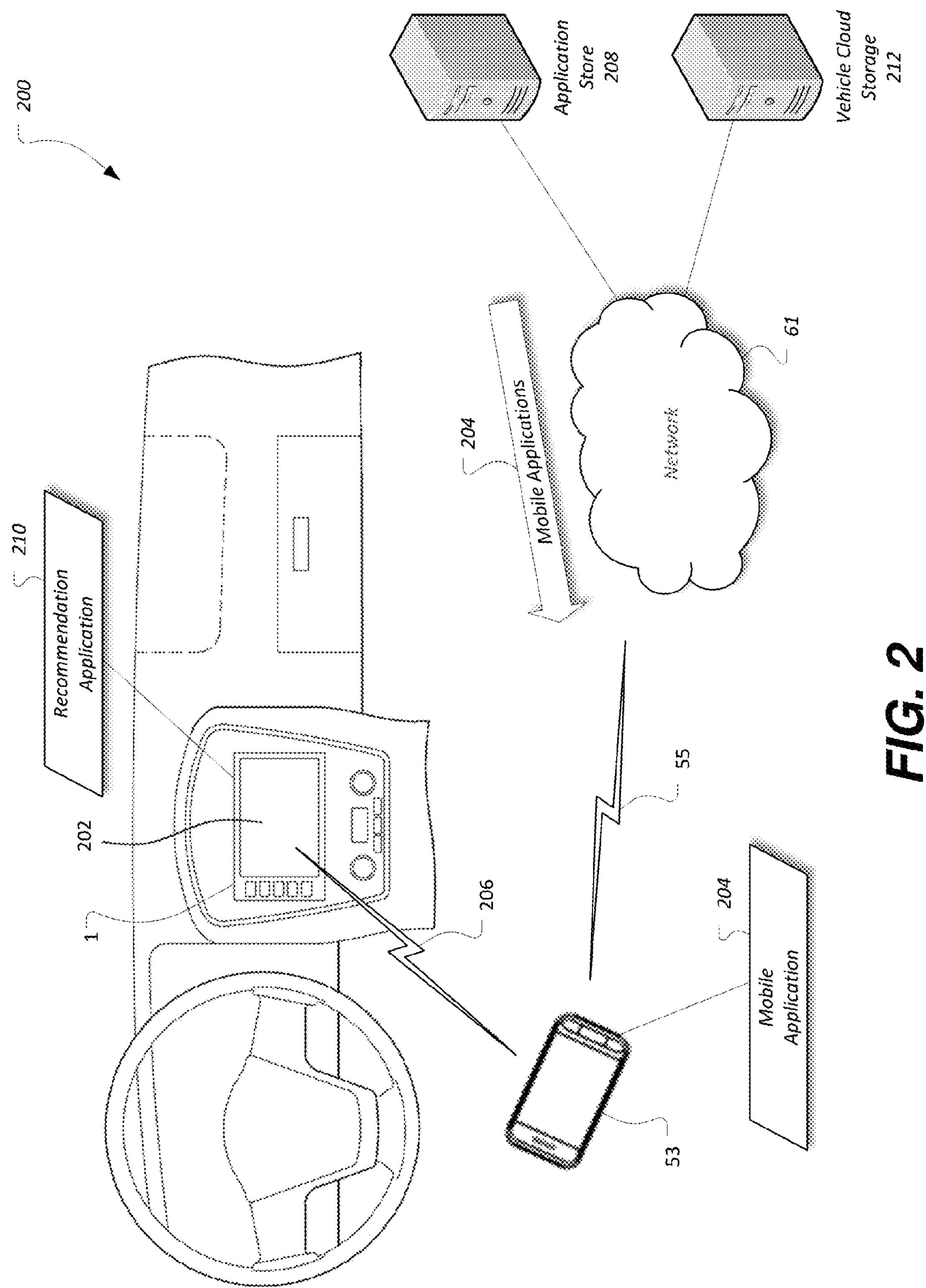
FIG. 2 illustrates an exemplary vehicle having a recommendation application.

FIG. 2 illustrates an exemplary system 200 including a vehicle 31 having a recommendation application 210. As illustrated, the vehicle 31 is in communication with a nomadic device 53 configured to execute downloaded mobile applications 204. As mentioned above, the CPU 3 of the VCS 1 may be configured to interface with one or more nomadic devices 53. To facilitate the interfacing, the VCS 1 may include mobile gateway functionality configured to provide vehicle 31 services to the nomadic device 53 connected to the VCS 1 over a connection 206. A mobile application 204 installed on the nomadic device 53 may utilize the connection 206 to register with the VCS 1 and take advantage of the HMI 202 and other services provided by the VCS 1. A recommendation application 210 installed on the VCS 1 may be configured to provide recommendations to the user regarding mobile applications 204 to be downloaded to the nomadic device 53 (or to the VCS 1 via the nomadic device 53) for use by the driver.

The HMI 202 of the vehicle 31 may refer to the interface that the user (e.g., the driver) uses to interact with the vehicle 31. The HMI 202 interface may include various types of inputs and outputs facilitating communication between the user and the VCS 1. As some examples, the HMI 202 may include the display 4 or other displays of the vehicle 31, a collection of preset buttons, media buttons (seek forward/backward, tune up/down, and play/pause), other application or system-associated menu items, and application or system-assigned voice commands.

The mobile application 204 may be configured to be executed by the nomadic device 53, and to interact with the user via the HMI 202 of the vehicle 31. As one example, a music player application 204 on the nomadic device 53 may interact with the VCS 1 to provide streaming music through the speaker 13 or stereo system output of the VCS 1. As another example, a navigation application 204 on the nomadic device 53 may interact with the VCS 1 to provide turn-by-turn directions for display on the screen 4 of the VCS 1.

In some cases, the mobile application 204 may be included on the nomadic device 53 as part of a default installation. In other cases, the mobile application 204 may be downloaded and installed by a user of the nomadic device 53, such as from an online application store 208. The application store 208 may be a digital distribution platform configured to provide software such as mobile applications 204 to devices such as nomadic devices 53. In some cases, the application store 208 may include categories or genres of mobile application 204 that may be browsed by the nomadic devices 53. The application store 208 may also include rating information about the available mobile applications 204 to illustrate which applications are liked by users, as well as download count information to illustrate which applications are popularly downloaded by users. By using the application store 208, the user of the nomadic device 53 may be able to view information and reviews of mobile applications 204, and download user-selected mobile applications 204 to be installed on the nomadic device 53 (or in other cases, to the VCS 1).

To utilize the HMI 202, the mobile application 204 may be configured to communicate with the VCS 1 over a connection 206 between the VCS 1 and the nomadic device 53. The connection 206 may include various wired and wireless data connections between the VCS 1 and the nomadic device 53 over which mobile application 204 data may be transmitted. As one example, the connection 206 may include a BLUETOOTH connection 206 between the BLUETOOTH transceiver 15 of the VCS 1 and a BLUETOOTH module of the nomadic device 53. Additionally or alternately, the connection 206 may include a USB connection 206 between the USB input 23 to the VCS 1 and a USB connection to the nomadic device 53.

The recommendation application 210 may be configured to be executed by the VCS 1, and to interact with the user to provide recommendations of mobile applications 204 that may be of interest to the driver. The recommendation application 210 may be configured to learn about the driver style, behavior and preferences, and perform the driver learning using a neural network, fuzzy logic or other suitable learning system, according to inputs such as Internet-based information, vehicle information, driver and environment sensing information and vehicle connectivity data. Based on the learned driving style, intentions and behavior, the recommendation application 210 may be configured to recommend mobile applications 204 for the driver to download that would be beneficial for the particular driver in enhancing his or her driving experience. The vehicle cloud storage 212 may be configured to maintain information in support of the recommendation application 210. For example, the vehicle cloud storage 212 may be configured to store information regarding what mobile applications 204 are installed for which drivers. Further aspects of the operation of the recommendation application 210 are discussed in detail below.

Figure 3:
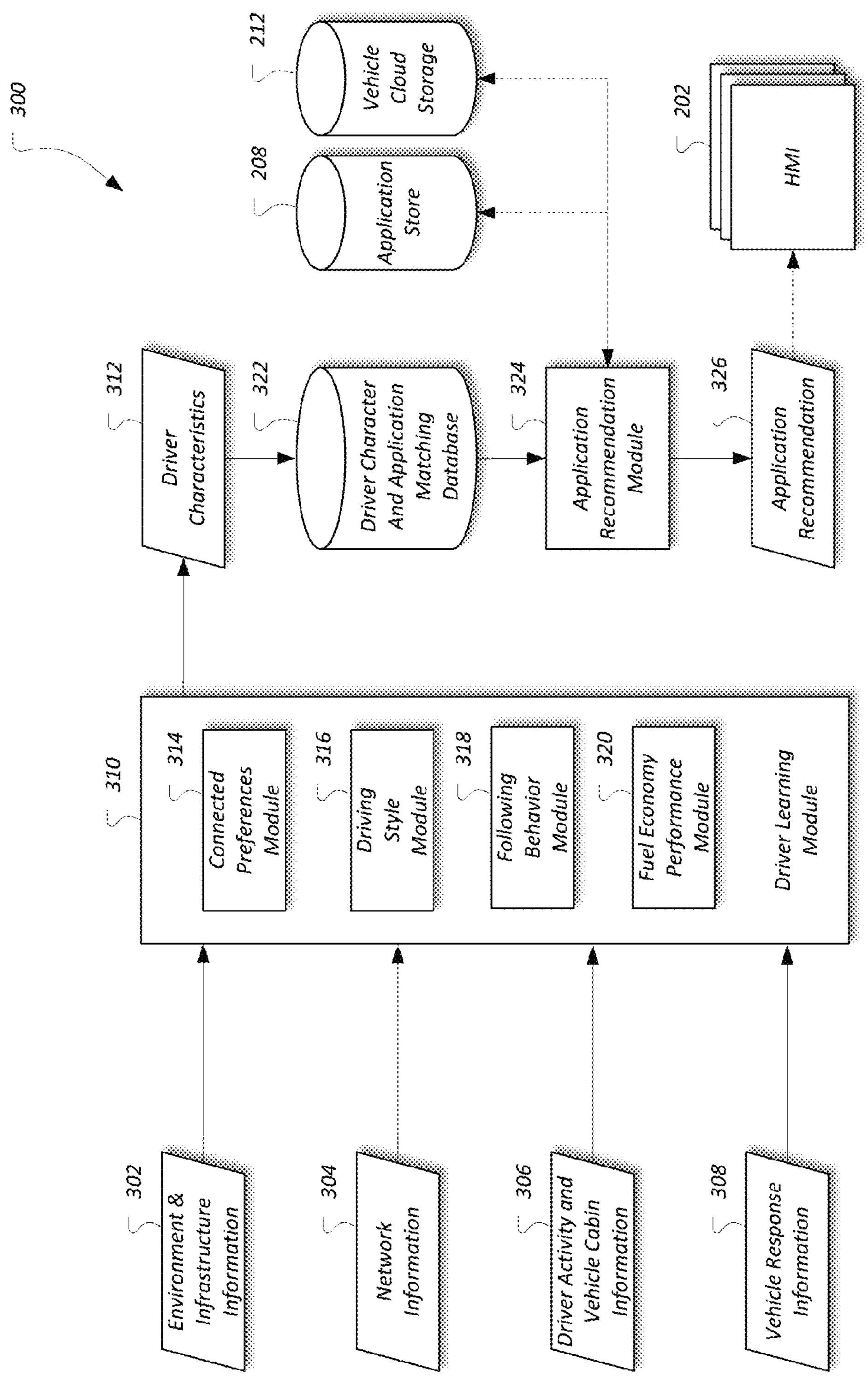
FIG. 3 illustrates an exemplary block diagram of a recommendation application for providing application recommendations to a vehicle driver.

FIG. 3 illustrates an exemplary block diagram 300 of a recommendation application 210 for providing application recommendations 326 to a vehicle 31 driver. The modules of the exemplary recommendation application 210 may be implemented by one or more processors or microprocessors of the vehicle 31 (such as the CPU 3 of the VCS 1) configured to execute firmware or software programs stored on one or more memory devices of the vehicle 31 (such as the storage 5 and 7). As illustrated, the recommendation application 210 includes a driver learning module 310 configured to receive information such as environment and infrastructure information 302, network information 304, driver activity and vehicle cabin information 306 and vehicle response information 308. The driver learning module 310 may be configured to learn driver characteristics 312 according to various included modules, such as a driver connected preferences module 314, a driving style module 316, a following behavior module 318, and a fuel economy performance module 320. The recommendation application 210 further includes a driver character and application matching database 322 configured to receive the learned driver characteristics 312 from the driver learning module 310. The recommendation application 210 also includes an application recommendation module 324 configured to access the driver character and application matching database 322, application store 208, and vehicle cloud storage 212 and determine the application recommendations 326 for the driver. The application recommendation module 324 may provide the application recommendations 326 to the driver using HMI 202 of the vehicle 31, of the nomadic device 53 or of another device. It should be noted that the modularization illustrated in the diagram 300 is exemplary, and other arrangements or combinations of elements including more, fewer, or differently separated modules may be used.

The environment and infrastructure information 302 may include information from sources external to the vehicle 31 or relating to conditions outside the vehicle 31. As some examples, the environment and infrastructure information 302 may include infrastructure information such as traffic light location and timing, locations of stop signs and other traffic controls, railway crossing locations and train stop timing, as well as indications of special events, such as construction and temporary changes in traffic regulation such as construction zones. As some further examples, the environment and infrastructure information 302 may include indirect information regarding the environment surrounding the vehicle 31, such as obstacles in the roadway or indications of the state of the vehicles surrounding the vehicle 31, such as whether brake lights or headlamps on other vehicles 31 are visibly engaged.

The network information 304 may include information retrieved from external sources of information, such as via the network 61. As some examples, the network information 304 may include current and predicted road congestion and weather conditions.

The driver activity and vehicle cabin information 306 may include information regarding driver inputs to the vehicle 31. As some examples, the driver activity and vehicle cabin information 306 may include information regarding driving inputs provided to the vehicle 31, such as brake pedal position, accelerator pedal position, steering wheel position, turning signal activation, and current gear selection. As some other examples, the driver activity and vehicle cabin information 306 may include information regarding non-driving inputs provided to the vehicle 31, such as current VCS 1 settings or accesses to features of the VCS 1 or mobile applications 204. The driver activity and vehicle cabin information 306 may be retrieved from various in-vehicle sources, such as via a vehicle bus (e.g., the CAN bus), or from vehicle systems separate from the vehicle bus (e.g., via direct connection).

The vehicle response information 308 may include information regarding aspects of vehicle 31 behavior that are responsive to the driver inputs. As some examples, the vehicle response information 308 may include information such as engine speed, vehicle speed, yaw, pitch, and roll, and lateral acceleration. Similar to the driver activity and vehicle cabin information 306, the vehicle response information 308 may also be retrieved via the vehicle bus or another connection to the relevant vehicle systems.

The driver learning module 310 may be configured to learn driver characteristics 312 based on inputs such as environment and infrastructure information 302, network information 304, driver activity and vehicle cabin information 306, and vehicle response information 308. The driver characteristics 312 may include information descriptive of the driving style of the driver of the vehicle 31. To perform the learning, the driver learning module 310 may utilize techniques such as a neural network trained based on samples of driver input data and resultant driver characteristics 312, or fuzzy logic techniques to determine how probable various driver characteristics 312 are included in the driver input data, or other suitable learning system. The driver learning module 310 may be configured to determine aspects of the driver characteristics 312 according to various modules.

For example, the driver learning module 310 may utilize the connected preferences module 314 to determine driver characteristics 312 related to what VCS 1 features the driver has an affinity to use. Such driver characteristics 312 may include, for instance, an indication that the driver may prefer a sports drive mode, or an indication that the drivers may prefer a comfort drive mode. As another example, the driver learning module 310 may utilize the driving style module 316 to determine driver characteristics 312 related to the style of driving performed by the driver. Such driver characteristics 312 may include, for instance, an indication that the driver may be more or less aggressive in brake or accelerator pedal inputs than other drivers. As yet another example, the driver learning module 310 may utilize the following behavior module 318 to determine driver characteristics 312 related to the affinity of the driver to closely follow other vehicles in traffic. Such driver characteristics 312 may include, for instance, an indication that the driver tailgates other vehicles, or that the driver keeps adequate following distance from the next vehicle. As an even further example, the driver learning module 310 may utilize the fuel economy performance module 320 to determine driver characteristics 312 related to the efficiency of driver use of vehicle fuel or battery energy. Such driver characteristics 312 may include, for instance, an indication of the average miles per gallon or miles per charge that the driver achieves, on average.

The driver character and application matching database 322 may be configured to receive the learned driver characteristics 312 from the driver learning module 310, and store the driver characteristics 312 for use by the recommendation application 210. The driver character and application matching database 322 may be further configured to store the driver characteristics 312 along with the date and time period to which they relate, to allow the application matching database 322 to maintain a history of driver behavior. As a more specific example, the driver learning module 310 may be configured to periodically determine driver characteristics 312, and these periodic driver characteristics 312 may be maintained in the application matching database 322 to form a history of driver behavior.

The application recommendation module 324 may be configured to access the driver character and application matching database 322 and, based on the current and/or historical driver characteristics 312, determine the application recommendations 326 for the driver. As one possibility, the application recommendation module 324 may be configured to identify one or more mobile applications 204 that are popularly downloaded or utilized by other drivers associated with the same or similar identified driver characteristics 312 stored in the driver character and application matching database 322. To determine which mobile applications 204 are popularly downloaded or utilized by other drivers, the application recommendation module 324 may be configured to access vehicle information maintained by the vehicle cloud storage 212. For example, multiple vehicles 31 may provide information regarding their identified driver characteristics 312 and currently-installed mobile applications 204 to the vehicle cloud storage 212. The application recommendation module 324 may query the vehicle cloud storage 212 using the driver characteristics 312 of the vehicle 31 to retrieve information regarding mobile applications 204 that are installed on vehicles 31 having the same or similar identified driver characteristics 312. If the application recommendation module 324 determines that certain mobile applications 204 are installed on other vehicles 31 having the same or similar identified driver characteristics 312, but not on the vehicle 31, then the application recommendation module 324 may generate an application recommendation 326 recommending those mobile applications 204 to the driver.

As another possibility, the application recommendation module 324 may be configured to identify one or more mobile applications 204 that may be recommended to the driver to improve a particular aspect of the driving style of the driver. For instance, if the driver is associated with the driver characteristic 312 of following too closely, then the application recommendation module 324 may search the application store 208 for a mobile application 204 that is highly rated and associated with tailgating driver behavior. As another example, if the driver is associated with the driver characteristic 312 of poor fuel efficient driving, then the application recommendation module 324 may search the application store 208 for a mobile application 204 that is highly rated and designed to provide indications to the driver when he or she is driving in an inefficient manner, to allow the driver to correct those behaviors. If the application recommendation module 324 identifies any such applications to improve an aspect of the driving style of the driver, then the application recommendation module 324 may generate an application recommendation 326 for those identified mobile applications 204. (In some cases, the aspect or aspects of driving style addressed by the mobile application 204 may be specified in the properties of the mobile application 204 in the application store 208, while in other cases, the application recommendation module 324 may be required to query the vehicle cloud storage 212 or another database to determine which mobile applications 204 are intended to address which aspects of driving style.)

The application recommendation module 324 may be further configured to provide the generated application recommendations 326 to the driver. As one possibility, the application recommendation module 324 may be configured to provide the application recommendations 326 to the driver using the HMI 202 of the vehicle 31, such as via the display 4, for selection by the driver for installation to the nomadic device 53. As another example, the application recommendation module 324 may be configured to provide the application recommendations 326 to the nomadic device 53 for display by the HMI of the nomadic device 53. As some other possibilities, the application recommendation module 324 may be configured to provide the application recommendations 326 to the driver in other ways, such as via an e-mail message including the application recommendations 326 sent to an e-mail account of the driver associated with the VCS 1, or via a Twitter message including the application recommendations 326 sent to an Twitter account of the nomadic device 53.

Regardless of approach, the driver may receive the application recommendations 326, and may choose to install the recommended mobile applications 204. Accordingly, using the application recommendations 326 determined by the recommendation application 210, the driver may be able to download and utilize mobile applications 204 that may help the driver to improve his or her driving experience.

Figure 4:
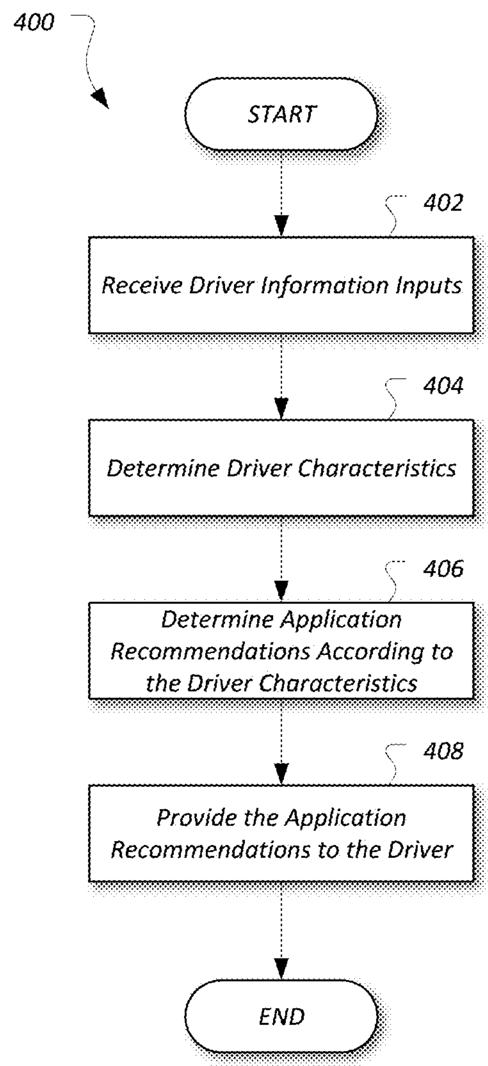
FIG. 4 illustrates an exemplary process for providing application recommendations for mobile applications to a driver of a vehicle, based on learned driver characteristics regarding the behavior of the driver.

FIG. 4 illustrates an exemplary process 400 for providing application recommendations 326 for mobile applications 204 to a driver of a vehicle 31, based on learned driver characteristics 312 regarding the behavior of the driver. The process 400 may be performed, for example, by the recommendation application 210 executed by the VCS 1 of the vehicle 31.

At operation 402, the recommendation application 210 receives driver information inputs. For example, the driver learning module 310 may be configured to receive inputs such as environment and infrastructure information 302, network information 304, driver activity and vehicle cabin information 306, and vehicle response information 308.

At operation 404, the recommendation application 210 determines driver characteristics 312. As some examples, the driver learning module 310 may utilize the connected preferences module 314 to determine driver characteristics 312 related to what VCS 1 features the driver has an affinity to use, the driving style module 316 to determine driver characteristics 312 related to the style of driving performed by the driver, the following behavior module 318 to determine driver characteristics 312 related to the affinity of the driver to closely follow other vehicles in traffic, and the fuel economy performance module 320 to determine driver characteristics 312 related to the efficiency of driver use of vehicle fuel or battery energy. The recommendation application 210 may store the determined driver characteristics 312 in the driver character and application matching database 322.

At operation 406, the recommendation application 210 determines application recommendations 326 according to the driver characteristics 312. For example, the application recommendation module 324 may access the driver character and application matching database 322 and, based on the driver characteristics 312, may determine the application recommendations 326 for the driver. As one possibility, the application recommendation module 324 may identify one or more mobile applications 204 that are popularly downloaded or utilized by other drivers associated with identified driver characteristics 312 stored in the driver character and application matching database 322. As another possibility, the application recommendation module 324 may identify one or more mobile applications 204 that may be recommended to the driver to improve a particular aspect of the driving style of the driver.

At operation 408, the recommendation application 210 provides the application recommendations 326 to the driver. As some examples, the application recommendation module 324 may provide the application recommendations 326 to the driver using the HMI 202 of the vehicle 31, or the HMI of the nomadic device 53. As some other possibilities, the application recommendation module 324 may provide the application recommendations 326 to the driver in other ways, such as via an e-mail message including the application recommendations 326 sent to an e-mail account of the driver associated with the VCS 1 of the vehicle, or via a Twitter message including the application recommendations 326 sent to an Twitter account of the nomadic device 53. After operation 408, the process 400 ends.

In general, computing systems and/or devices, such as the VCS 1, nomadic device 53, application store 208 and vehicle cloud storage 212, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices, such as the VCS 1, nomadic device 53, application store 208 and vehicle cloud storage 212, generally include computer-executable instructions such as the instructions of the mobile applications 204 and recommendation application 210, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for recommending applications, comprising:
- a memory storing a recommendation application; and
- a processor of a vehicle programmed to execute the recommendation application to
  - identify driver characteristics descriptive of a driving style of a driver of the vehicle based at least in part on captured vehicle data,
  - determine an application recommendation for a mobile application to be installed by the driver based on the driver characteristics, and
  - send the application recommendation to the driver.

2. The system of claim 1, wherein the processor is further programmed to execute the recommendation application to identify the mobile application by searching an application store according to criteria including at least one of: applications that are popularly downloaded by other drivers associated with the driver characteristics, applications that are popularly utilized by other drivers associated with the driver characteristics, or applications that are highly-rated by other drivers associated with the driver characteristics.

3. The system of claim 2, wherein the driver characteristics are indicative of fuel inefficient driving, and the mobile application is configured to search the application store for a mobile application that is highly rated and configured to provide indications to the driver during inefficient driving conditions.

4. The system of claim 1, wherein the processor is further programmed to execute the recommendation application to identify the mobile application as being designed to improve a particular aspect of the driving style of the driver as indicated by the driver characteristics.

5. The system of claim 4, wherein the driver characteristics are indicative of a driver-specific driving issue, and the mobile application of the application recommendation is programmed to provide alerts to the driver to address the driver-specific driving issue.

6. The system of claim 5, wherein at least one of (i) the driver-specific issue is following too close, and the mobile application is configured to provide an alert to the driver when captured vehicle data is indicative of the vehicle following less than a predetermined threshold distance, (ii) the driver-specific issue is failure to utilize turn signals, and the mobile application is configured to provide an alert to the driver when captured vehicle data is indicative of the vehicle turning without signaling, or (iii) the driver-specific issue is driver drowsiness, and the mobile application is configured to provide an alert to the driver when captured vehicle data is indicative of driver drowsiness.

7. The system of claim 1, wherein the captured vehicle data includes information indicative of driver inputs to the vehicle and behavior of the vehicle responsive to the driver inputs.

8. The system of claim 1, wherein the processor is further programmed to execute the recommendation application to:

display the application recommendation to the driver by way of a human-machine interface of the vehicle;

receive a selection from the driver to install the mobile application; and install the mobile application.

9. The system of claim 1, wherein the mobile application is installed on a nomadic device in communication with the processor.

10. A computer-implemented method comprising:

identifying driver characteristics descriptive of a driving style of the driver of a vehicle based at least in part on captured vehicle data indicative of driver inputs to the vehicle and behavior of the vehicle responsive to the driver inputs, determining an application recommendation for a mobile application to be installed by the driver based on the driver characteristics, and sending the application recommendation to the driver.

11. The method of claim 10, further comprising identifying the mobile application by searching an application store according to criteria including at least one of: applications that are popularly downloaded by other drivers associated with the driver characteristics, applications that are popularly utilized by other drivers associated with the driver characteristics, or applications that are highly-rated by other drivers associated with the driver characteristics.

12. The method of claim 10, further comprising identifying the mobile application as being designed to improve a particular aspect of the driving style of the driver as indicated by the driver characteristics.

13. The method of claim 12, wherein the driver characteristics are indicative of a driver-specific driving issue, and the mobile application of the application recommendation is programmed to provide alerts to the driver to address the driver-specific driving issue.

14. The method of claim 10, further comprising:

displaying the application recommendation to the driver by way of a human-machine interface of the vehicle;

receiving a selection from the driver to install the mobile application; and installing the mobile application.

15. The method of claim 10, wherein the mobile application is installed on a nomadic device in communication with the vehicle computing system.

16. A non-transitory computer-readable medium including instructions of a recommendation application that, when executed by a vehicle computing system, is configured to cause the vehicle computing system to:

identify driver characteristics descriptive of a driving style of a driver of the vehicle based at least in part on captured vehicle data indicative of driver inputs to the vehicle and behavior of the vehicle responsive to the driver inputs, determine an application recommendation for a mobile application to be installed by the driver based on the driver characteristics, and send the application recommendation to the driver.

17. The medium of claim 16, further including instructions configured to cause the vehicle computing system to identify the mobile application by searching an application store according to criteria including at least one of: applications that are popularly downloaded by other drivers associated with the driver characteristics, applications that are popularly utilized by other drivers associated with the driver characteristics, or applications that are highly-rated by other drivers associated with the driver characteristics.

18. The medium of claim 16, further including instructions configured to cause the vehicle computing system to identify the mobile application as being designed to improve a particular aspect of the driving style of the driver as indicated by the driver characteristics.

19. The medium of claim 18, wherein the driver characteristics are indicative of a driver-specific driving issue, and the mobile application of the application recommendation is configured to provide alerts to the driver to address the driver-specific driving issue.

20. The medium of claim 16, further including instructions configured to cause the vehicle computing system to:

display the application recommendation to the driver by way of a human-machine interface of the vehicle;

receive a selection from the driver to install the mobile application; and install the mobile application.

* * * * *